Feb. 5, 1957 J. ROMAN ET AL 2,780,181
DEVICE FOR PREPARING RAVIOLI
Filed Aug. 26, 1954
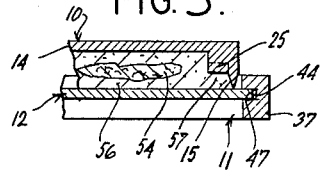
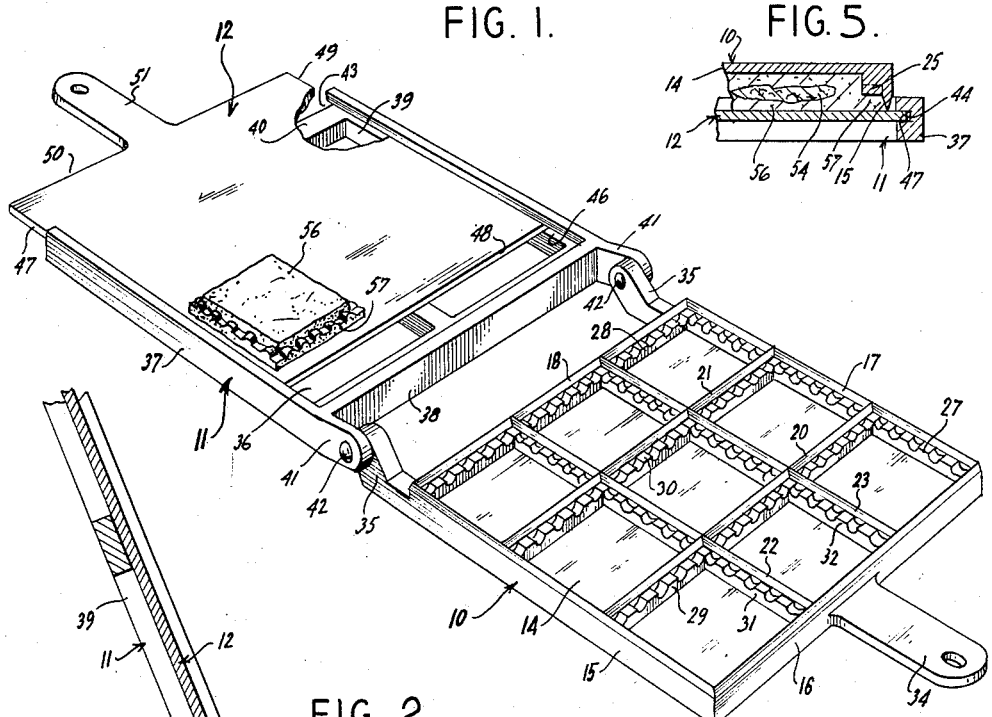
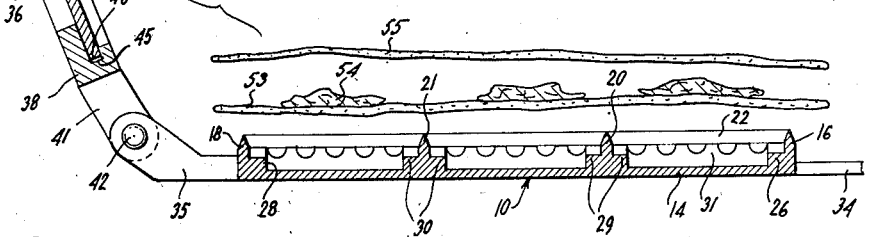
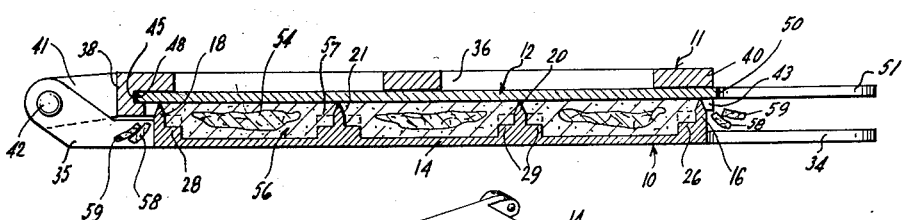
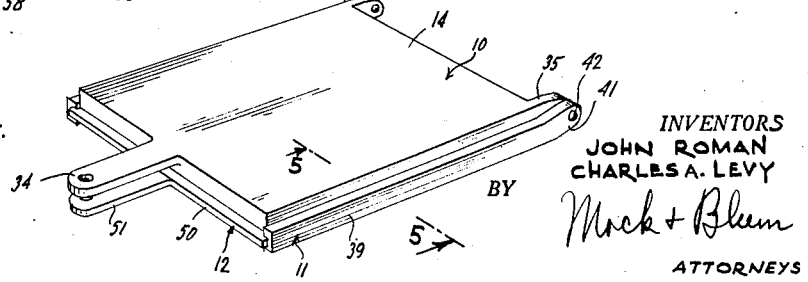
INVENTORS
JOHN ROMAN
CHARLES A. LEVY
BY Mock + Blum
ATTORNEYS An extracted page from United States Patent Office.

2,780,181

DEVICE FOR PREPARING RAVIOLI

John Roman, Elizabeth, N. J., and Charles A. Levy, Brooklyn, N. Y.

Application August 26, 1954, Serial No. 452,281

1 Claim. (Cl. 107—1)

This invention relates generally to apparatus for preparing food. It is particularly directed to improvements in the preparation of ravioli and similar foods, and embraces a novel kitchen utensil adapted to be employed in carrying out the method of the present invention.

It is a general object of the present invention to provide a device for more simply and efficiently preparing various foods, such as ravioli and the like.

More particularly, the present invention contemplates the provision of a method of food preparation in which the various ingredients are superposed one on the other and, by a quick and easy manual operation, are both (1) formed and cut to the desired shape and size, and (2) disposed on a cooking implement for immediate delivery to a cook stove or range.

It is another object of the present invention to provide a kitchen utensil of the type described which is simple and durable in construction to afford long continued, trouble free operation, which is small in size and light in weight for convenient storage and handling, which is attractive in appearance for display when not in use, and which can be manufactured by mass production techniques at a reasonable cost.

It is a further object of the present invention to provide a kitchen utensil having the advantageous characteristics mentioned in the foregoing paragraph, which includes a tray for receiving the foodstuff ingredients, and a cover movable into and out of closing relation with respect to the tray for forming the foodstuff; and, in addition to its forming function, the cover is adapted to support the food during the cooking operation.

Other objects of the invention will become apparent upon reading the following specification and referring to the accompanying drawings, which form a material part of this disclosure.

The invention accordingly consists in the features of construction, and combinations and arrangements of elements which will be exemplified in the following description, and of which the scope will be indicated by the appended claim.

In the drawings:

Figure 1 is a perspective view showing the device of the present invention in open condition at a latter stage of the food preparation, the device being partly broken away for clarity of understanding;

Fig. 2 is a partial, longitudinal sectional view showing the device of Fig. 1 and illustrating an early stage in the method of food preparation;

Fig. 3 is a sectional view similar to Fig. 2 illustrating an intermediate stage of the method;

Fig. 4 is a perspective view showing the utensil of the present invention in its closed positon of Fig. 3; and Fig. 5 is a fragmentary, sectional view taken substantially along the line 5—5 of Fig. 4.

Referring now more particularly to the drawings, the embodiment of the invention illustrated therein comprises a tray, generally designated 10, a frame, generally designated 11, hingedly connected to the tray, and a cover, generally designated 12, mounted in the frame for movement therewith and slidably insertible and withdrawable therefrom.

The tray 10 is preferably, but not necessarily generally rectangular in configuration and includes a substantially flat bottom wall 14 and upstanding peripheral side walls 15, 16, 17 and 18 extending entirely about the circumference of the bottom wall. It will be observed from the drawings that the upper edges of the peripheral walls 15—18 are beveled or tapered to define relatively sharp, knife edges. Extending across the tray bottom wall 14, between the peripheral walls 15 and 17, are a pair of upstanding parallel walls or partitions 20 and 21, which are spaced from each other and inwards from the peripheral walls 16 and 18. Similarly, a pair of parallel upstanding walls, or partitions 22 and 23 extend across the bottom wall 14 between the peripheral walls 16 and 18, spaced from each other and the walls 15 and 17. That is, the walls or partitions 22 and 23 intersect at right angles with and pass through the walls or partitions 20 and 21, so that the inner walls or partitions 20—23 and the outer or peripheral walls 15—18 combine with each other and with the bottom wall 14 to define a plurality of relatively shallow, open top receptacles or containers. As will presently become apparent, the number of receptacles may be greater or less than that illustrated, or of a different shape, as desired.

Formed on the inner sides of the peripheral or outer walls 15, 16, 17 and 18, and extending therealong, are raised ledges or shoulders 25, 26, 27 and 28, respectively (ledge 25 being obscured in the drawings), at a level spaced below the upper edges of the peripheral walls. Each of the ledges 25, 26, 27 and 28 is preferably provided with a plurality of transverse grooves or serrations formed in its upper surface. Similar raised ledges or shoulders extend along both sides of the inner walls or partitions 20—23 spaced below the upper edges thereof. More particularly, the inner wall 20 is provided on its opposite sides with a pair of raised ledges or shoulders 29, the inner wall 21 is provided with a pair of ledges 30, the inner wall 22 with ledges 31, and the inner wall 23 with ledges 32. As in the ledges 25—28, the ledges 29—32 are also preferably provided with upwardly facing grooves or serrations.

It will now be understood that the plurality of receptacles defined by the bottom wall 14, peripheral walls 15—18, and inner walls 20—23 are each provided interiorly thereof with a circumferentially extending raised ledge. Stated otherwise, the ledges 25—32 combine with each other to define a raised ledge extending circumferentially about the interior of each tray receptacle.

Projecting outwards from one peripheral side wall 16 is an arm or handle 34; and, a pair of spaced ears 35 project outwards from the opposite peripheral wall 18. It will be observed in the drawings that the proximate portions of the ears 35 are spaced below the upper edge of the peripheral wall 18, and that the distal ends of the ears are angulated upwards beyond the latter wall.

The frame 11 may also be generally rectangular in configuration and cored out, as at 36 for minimizing weight. That is, the frame 11 includes rectangularly arranged side members 37, 38, 39 and 40, and a pair of spaced, outwardly extending ears 41 on the side member 38. As best seen in Fig. 3, the frame ears 41 have their distal ends angulated downwards and are pivotally connected to the upwardly angulated distal ends of the ears 35 by pins 42. The frame side members 37, 38 and 39 are formed, respectively, with longitudinally extending, inwardly facing grooves 44, 45 and 46 which open into each other at the junctures of the side members. Further, the frame member 40 has its underside cut away as at 43 permitting the grooves 44 and 46 to open outwards through the frame member 40.

While the tray 10 and frame 11 may be fabricated of any suitable material, such as wood, metal or plastic, the latter is preferred both for its attractive appearance, light weight and adaptability to mass production.

The cover or plate 12 is preferably formed of sheet metal, and is illustrated as being generally rectangular in shape. More specifically, the cover plate has peripheral side edges 47, 48, 49 and 50, and is of such size that the edges 47 and 49 are slidably received within the frame grooves 44 and 46, while the plate edge 48 may extend into the frame groove 45. Thus, the cover plate 12 is slidably mounted in the frame 11 and may be completely inserted therein, as in Fig. 3, or completely withdrawn from the frame, as desired. On the cover plate edge 50, projecting outwardly therefrom, is an arm or handle 51 which facilitates manual actuation of the sliding cover plate movement.

Of course, the cover plate 12 is also swingable with the frame 11 relative to the tray 10; and, by reason of the angulation of the ears 35 and 41, the cover plate is movable with the frame into and out of engagement with the upper edges of the receptacle walls 15—18 and 20—23 for opening and closing the receptacles defined by the walls.

In the preparation of ravioli and similar foods, the cover plate 12 is inserted into the grooves 44, 45 and 46 of the frame 11, and the latter is swung away from the tray 10 to open the tray receptacles. A first layer or sheet 53 of dough or other foodstuff ingredient is placed on the tray 10 overlying the tray receptacles, preferably with its marginal portions extending beyond the peripheral side walls 15—18 of the tray. Wads of stuffing or filling 54, which may be of appropriate forcemeat in the case of ravioli, are placed on the sheet 53 each overlying or directly above one of the tray receptacles and spaced inwards from the side walls of the associated receptacles, so as to be appreciably spaced from each other. A second sheet or layer 55 of dough or other appropriate material is arranged over the stuffing 54 and first sheet 53, preferably coextensive with the latter so that its marginal portions will be disposed beyond the peripheral side walls of the tray 10.

The frame 11 is then swung toward the tray 10, as by manual operation of the handle 51, and the cover plate 12 pressed against the layer 55. Movement of the frame 11 is continued until the cover plate 12 engages with the knife-like upper edges of the tray receptacle walls and closes the receptacles, as in Fig. 3. Obviously, the foodstuff ingredients 53, 54 and 55 will thereby be packed into the tray receptacles, and severed along the upper edges of the receptacle sides so that an independent food article 56 is formed in each tray receptacle. Further, the portions of the sheets 53 and 55 overlying the circumferentially extending ledges or shoulders of the tray receptacles will be united or fused by compression between the ledges and cover plate, so that the dough layers will define an enclosure completely encasing each of the stuffing wads 54. Where the receptacle ledges are serrated or grooved, the marginal portion 57 of each article of foodstuff will be crimped to insure secure closure thereof. Thus the tray receptacles are shaped so as to form snug casings about the stuffing when the cover 12 is pressed against the upper layer 55.

As shown in Fig. 3, the edge margins 58 and 59 of the sheets 53 and 55, which extend beyond the peripheral side walls of the tray 10, are severed by engagement of the cover plate 12 with the peripheral side walls, and permitted to fall away or otherwise be removed.

With the independent articles 56 of food packed in the tray receptacles, and the cover plate 12 in closing relation with respect to the receptacles, as illustrated in Fig. 3, the tray and frame are inverted to the position of Fig. 4. The tray 10 may then be swung open, away from the frame 11, to the position of Fig. 1, leaving the foodstuff articles 56 on the cover plate 12. That is, inversion of the frame 11 and tray 10, and opening of the latter away from the frame, effects transfer of the ravioli or other articles 56 from within the tray receptacles to regularly spaced positions on the cover plate 12. The cover plate may now be slidably withdrawn from the frame slots and the ravioli heated or cooked while on the cover plate. Thus, the cover plate serves also as the cooking utensil for holding the foodstuff articles 56 formed in the tray receptacles.

From the foregoing, it is seen that the present invention provides a device for preparing food which fully accomplish its intended objects, and which is well adapted to meet practical conditions of use.

Although the present invention has been described in some detail by way of illustration and example for purposes of clarity of understanding, it is understood that certain changes and modification may be made within the spirit of the invention and scope of the appended claim.

What is claimed is:

A kitchen utensil comprising a tray provided with a plurality of open top food receptacles, a frame having one side hingedly connected to one side of said tray and swingable into and out of overlying relation with respect to said receptacles, a cover plate, said frame including rectangularly arranged sides, certain of said sides being formed with longitudinally extending inwardly facing grooves which open into each other at the junctures of their respective sides, at least one of said sides being cut away to permit said grooves to open outwards of said frame to slidably receive said cover plate therein, said cover plate being movable with said frame into and out of engagement with the upper edges of said receptacles for closing and opening the latter, said closing movement of said cover plate serving to pack food into said receptacles and to sever the food exteriorly of said receptacles from the packed food, said tray and frame being invertible to transfer the packed food from said receptacles to said cover plate whereby withdrawal of said cover plate from said frame permits cooking of the food transferred thereon.

References Cited in the file of this patent

UNITED STATES PATENTS

| Number | Name | Date |
|---|---|---|
| 216,300 | Adam | June 10, 1879 |
| 739,357 | Stan | Sept. 22, 1903 |
| 1,236,998 | Tommasini | Aug. 14, 1917 |
| 1,303,083 | Luna | May 6, 1919 |
| 1,337,988 | Abel | Apr. 27, 1920 |
| 1,814,485 | Moss | July 14, 1931 |
| 2,001,792 | Lombi | May 21, 1935 |
| 2,081,080 | Baker | May 18, 1937 |
| 2,173,760 | Moran | Sept. 19, 1939 |
| 2,248,957 | Casali | July 15, 1941 |
| 2,377,936 | Harris et al. | June 12, 1945 |
| 2,386,993 | Valdastri | Oct. 16, 1945 |

FOREIGN PATENTS

| 767,459 | France | May 1, 1934 |